(12) United States Patent
Wu

(10) Patent No.: US 7,817,530 B2
(45) Date of Patent: Oct. 19, 2010

(54) OPTICAL DISC AND REGISTERING METHOD FOR LABEL SIDE THEREOF

(75) Inventor: Fung-Hsu Wu, Gueishan Township, Taoyuan County (TW)

(73) Assignee: Daxon Technology Inc., Tao-Yuan Hsien (TW)

(*) Notice: Subject to any disclaimer, the term of this patent is extended or adjusted under 35 U.S.C. 154(b) by 452 days.

(21) Appl. No.: 11/849,385

(22) Filed: Sep. 4, 2007

(65) Prior Publication Data

US 2008/0181093 A1 Jul. 31, 2008

(30) Foreign Application Priority Data

Jan. 26, 2007 (TW) ............... 96102953 A

(51) Int. Cl.
*G11B 7/24* (2006.01)
(52) U.S. Cl. ............... 369/275.4; 369/44.13; 369/47.22
(58) Field of Classification Search ............ None
See application file for complete search history.

(56) References Cited

U.S. PATENT DOCUMENTS 5,886,985 A 3/1999 Kobayashi et al.

7,497,534 B2* 3/2009 Struk et al. ............. 347/2

FOREIGN PATENT DOCUMENTS

| JP | 08339634 | 12/1996 |
|---|---|---|
| JP | 2000149271 | 5/2000 |
| JP | 2004213796 | 7/2007 |
| TW | 460872 | 10/2001 |
| TW | 200403630 | 3/2004 |

OTHER PUBLICATIONS

Patent Application No. JP2007214380, Notification of Reasons for Refusal, Jan. 26, 2010, 6 pages.
TW 096102953, Office Action Communication, Mar. 30, 2010, 6 pages.

* cited by examiner

*Primary Examiner*—Muhamnmad N. Edun
(74) *Attorney, Agent, or Firm*—Hoffman Warnick LLC

(57) ABSTRACT

The invention provides an optical disc and a registering method for labeling on a label side of the optical disc. More particularly, the label side has a plurality of turns of wobbled grooves connected in series to form a spiral track. The turns of the wobbled grooves are then to provide a registering reference.

9 Claims, 7 Drawing Sheets

OPTICAL DISC AND REGISTERING METHOD FOR LABEL SIDE THEREOF

BACKGROUND OF THE INVENTION

1. Field of the Invention

This invention relates to an optical disc and a method for registering on a label side of the optical disc. More particularly, the label side has a plurality of turns of wobbled grooves connected in series to form a spiral track. Besides, the turns of wobbled grooves are provided to be the registering reference.

2. Description of the Prior Art

Recordable optical discs and rewritable optical discs have been widely adopted for storing data. However, it's not easy to know the information on the disk by eyes. Thus, to display stored information on the disk is an attractive feature.

Consumers always expect more convenient methods to recognize data, i.e., texts, images, or the like, recorded in their optical discs, methods capable of labeling on a label side (i.e. a non-data side or a top surface) of an optical disc have been continuously developed. Basic methods capable of labeling on the optical disc comprises writing on the label side of the optical disc with a permanent label maker (e.g. a sharpie maker) and sticking a printed paper sticker label on the label side of the optical disc. Other label methods performed in optical disc drivers comprise printing with ink jet, thermal wax transfer, thermal dye transfer, and the like. Additionally, lasers can be used in an optical disc driver for labeling on a disc. The aforesaid label methods are applicable for CD-R, CD+R, CD-RW, DVD-R, DVD+R, DVD-RW, and other types of optical discs.

Methods of writing an image on a label side of an optical disc are disclosed. However, to produce a track or other type of marking to assist in registering is an issue of labeling an image on a label side of an optical disc. Saw-teeth, triangles, or other reference marks pre-printed on a label side of an optical disc have been disclosed in U.S. patent application Ser. No. 10/347,074.

Please refer to FIG. 1. FIG. 1 is a schematic diagram illustrating a label side 10 of an optical disc 1 disclosed in prior art. The label side 10 of the optical disc 1 has a plurality of reference marks 100. As shown in FIG. 1, the reference marks 100 are pre-printed on the label side 100 of the optical disc 1. Referring to FIG. 1, a method of labeling an image on the optical disc 1 comprises the following steps. At first, a laser spot 18 emitted from an optical pick-up unit (not shown) is registered on an absolute radial position R0 of the label side 10 of the optical disc 1 according to the reference marks 100. Theoretically, the aforesaid step can be regarded as a return-to-zero step and a step of calibrating center-deviation. Afterward, the laser spot 18 is moved along a radial direction outside to a first radial position R1. Thereby, an image of a first track is written on the optical disc 1. Subsequently, the aforesaid steps are repeated. In other words, the laser spot 18 is moved outwardly along the radial direction, and the image of each of tracks is written on the optical disc 1 sequentially until a whole image is completed.

However, according to the registering method in the prior art, an optical pick unit sequentially writes the image of each of tracks in a concentric circle path on the label side 10. After the optical pick unit writes the image of a track, the position of the laser spot must be registered again on the next track. Thus, it takes from tens of minutes to half an hour in writing images on a label side for the labeling method in the prior art. Further, time consumption is a main disadvantage of the prior art.

SUMMARY OF THE INVENTION

The scope of the invention is to provide an optical disc with a plurality of turns of wobbled grooves on the label side of itself. More particularly, the turns of wobbled grooves are connected in series to form a spiral track and provide a registering reference.

According to a preferred embodiment of the invention, an optical disc comprises a data side and a label side. The data side is configured for storing data, and the label side is configured for receiving an image. The label side has a plurality of turns of wobbled grooves connected in series to form a spiral track. The label side defines a radial direction and a circumferential direction. The turns of wobbled grooves are formed of wobbles with a fixed cycle in the radial direction and the wobbles substantially are extended in the circumferential direction.

A registering method according to a preferred embodiment of the invention comprises the following steps. At first, when an optical disc rotates, a laser spot is guided to the turns of wobbled grooves to obtain a reflected light. Next, the reflected light is converted into a wobble signal. The wobble signal is then monitored. At last, based on a request signal, an optical pick-up unit is registered on one of the turns of wobbled grooves according to the wobble signal.

The advantage and spirit of the invention may be understood by the following recitations together with the appended drawings.

BRIEF DESCRIPTION OF THE APPENDED DRAWINGS

DETAILED DESCRIPTION OF THE INVENTION

The invention provides an optical disc with a plurality of turns of wobbled grooves on a label side (or non-data side) of itself. More particularly, the turns of wobbled grooves are connected in series to form a spiral track. The label side comprises a plurality of recording units formed along the turns of wobbled grooves. The invention also provides a method for registering an optical pick-up unit of an optical data recording apparatus according to the turns of wobbled grooves. Preferred embodiments of the invention are disclosed as follows.

Figure 1:
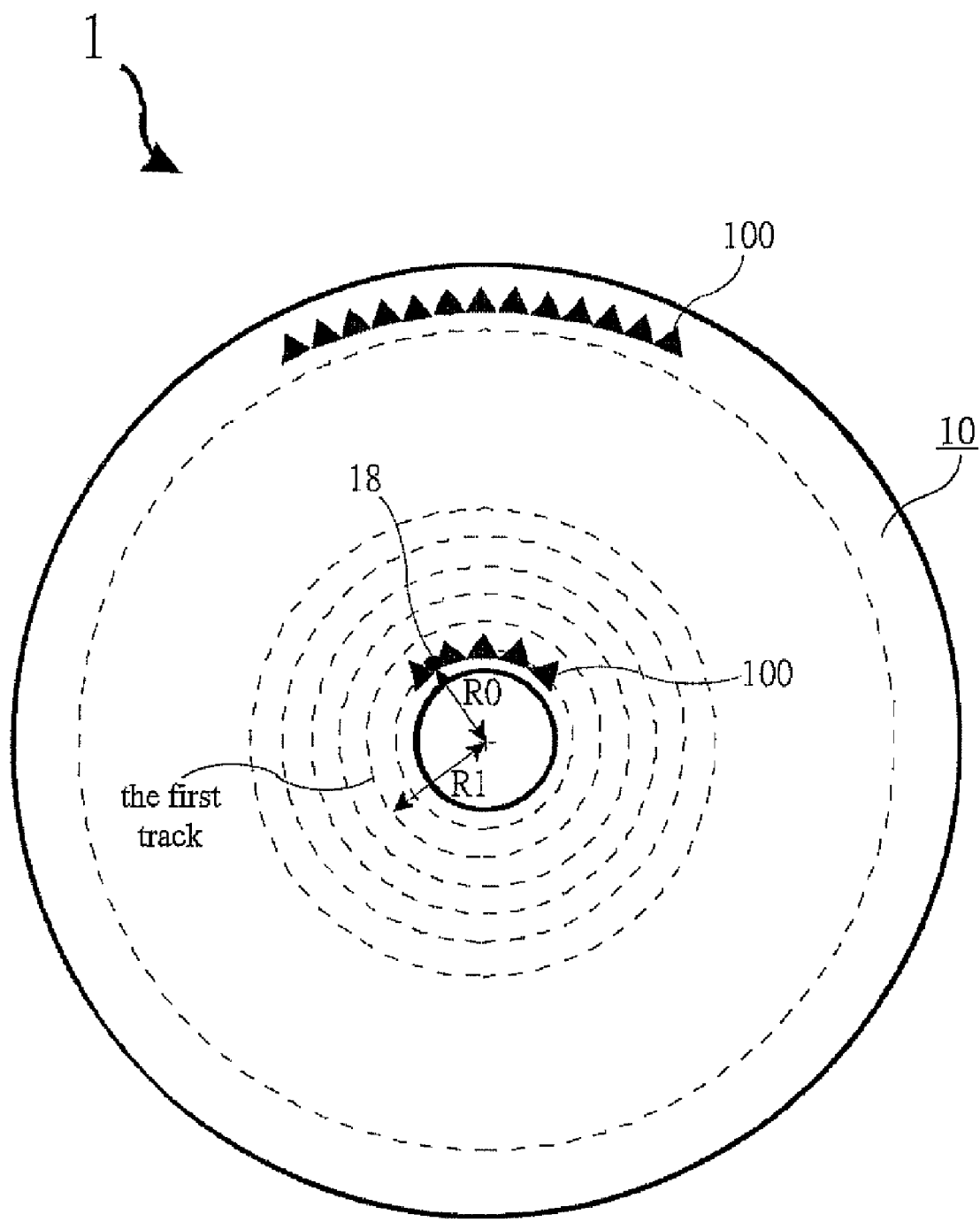
FIG. 1 is a schematic diagram illustrating a label side of an optical disc disclosed in prior art.
Figure 2A:
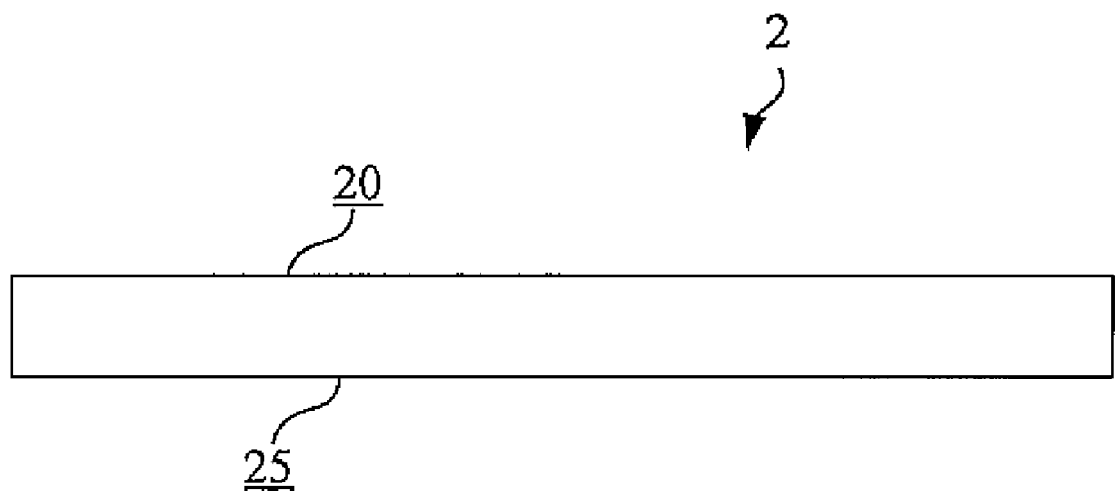
FIG. 2A is schematic diagram illustrating a side view of an optical disc according to a preferred embodiment of the invention.

Please refer to FIG. 2A. FIG. 2A is schematic diagram illustrating a side view of an optical disc 2 according to a preferred embodiment of the invention. The optical disc 2 comprises a data side 25 and a label side 20. The data side 25 is configured for storing data, and the label side 20 is configured for receiving texts, images or other label patterns.

Figure 2B:
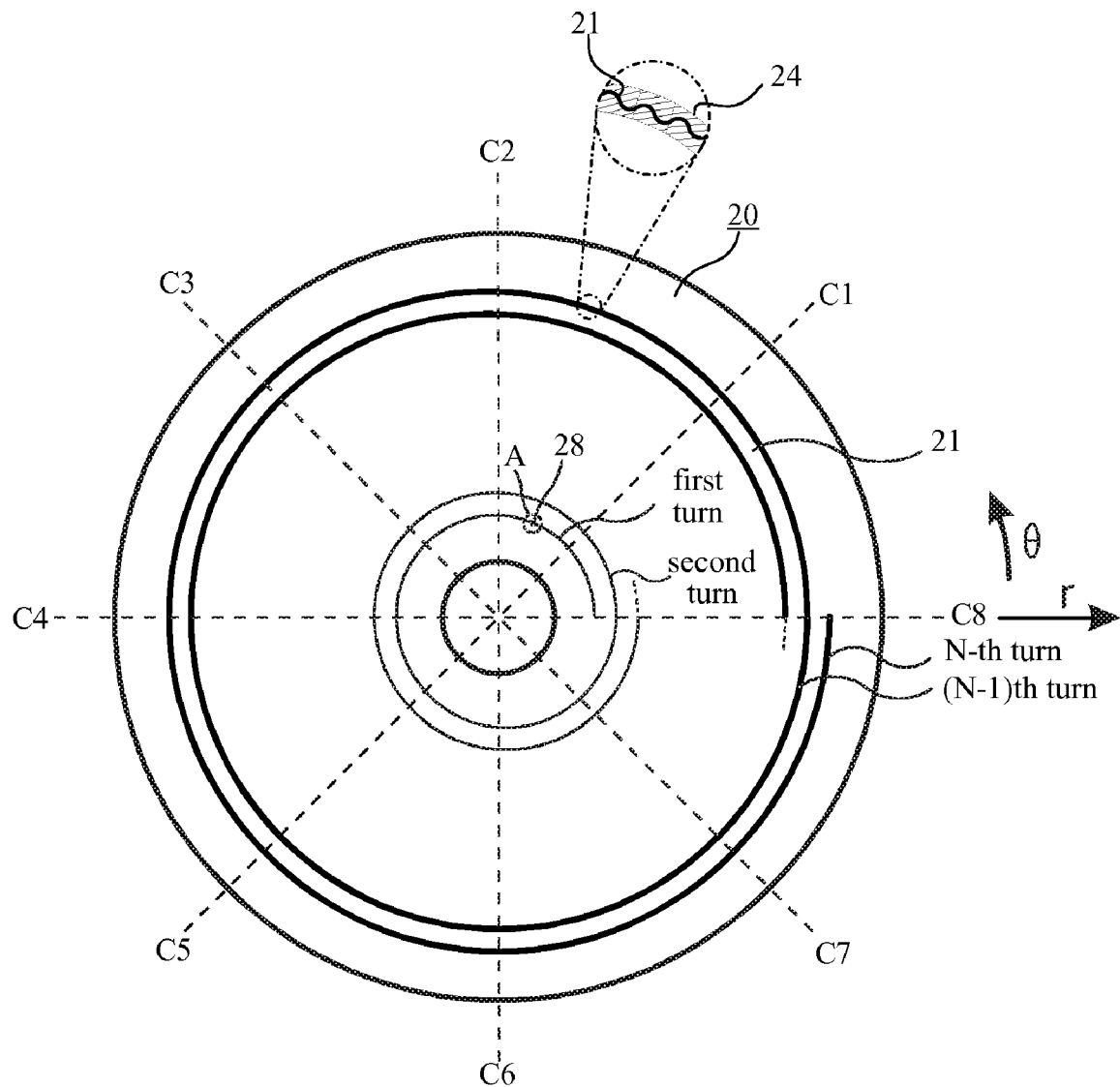
FIG. 2B is a schematic diagram illustrating the label side of the optical disc shown in FIG. 2A.

Please refer to FIG. 2B. FIG. 2B is a schematic diagram illustrating the label side 20 of the optical disc 2 shown in FIG. 2A. The label side 20 has N turns of wobbled grooves 21 connected in series and forming a spiral track, wherein N is an integer larger than 1. The label side 20 defines a radial direction and a circumferential direction. The N turns of wobbled grooves are formed of wobbles with a fixed cycle in the radial direction, and the wobbles substantially are extended in the circumferential direction. Additionally, the label side 20 comprises a plurality of recording units 24 formed along the N turns of wobbled grooves 21.

Figure 3A:
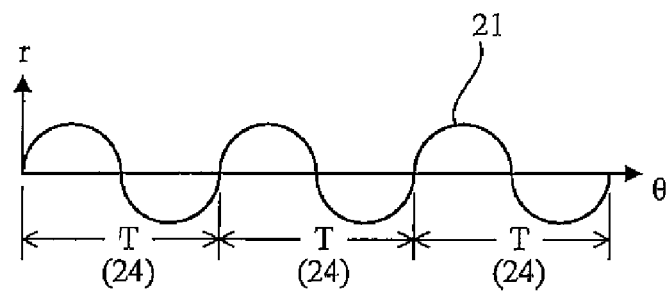
FIG. 3A is a schematic diagram illustrating a radial position curve of a wobbled groove.

Referring to FIG. 3A, FIG. 3A is a schematic diagram illustrating a radial position curve of a wobbled groove 21. The wobbled groove 21 has a fixed period and wobbles toward the radial direction (r). The radial position curve shows that a radiation position (r) of the wobbled groove 21 varies with a circumferential position (θ). In this embodiment, a length of each of the recording units 24 shown in FIG. 2B corresponds to a fixed cycle T of the wobbled groove 21. In other embodiments, the length of the recording units 24 can also be corresponding to a multiple or fraction of the fixed cycle.

Figure 3B:
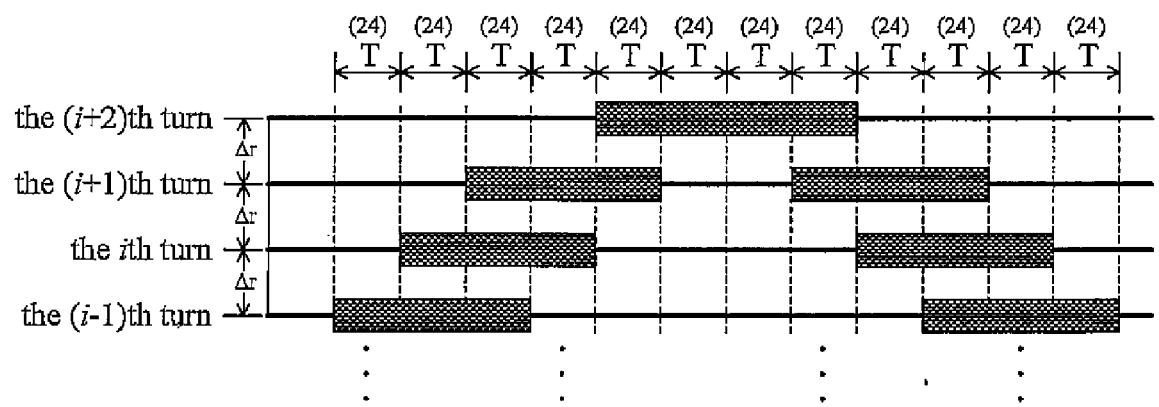
FIG. 3B is a schematic diagram illustrating the (i−1)th through the (i+2)th turns of the wobbled grooves, wherein i is an integer index ranging from 1 to (N−2).

Please refer to FIG. 3B. FIG. 3B is a schematic diagram illustrating the (i−1)th through the (i+2)th turns of the wobbled grooves 21, wherein i is an integer index ranging from 1 to (N−2). As shown in FIG. 3B, each of the turns of wobbled grooves 21 is respectively divided into a plurality of recording units 24. Colors of assigned recording units (e.g. hatched recording unit shown in FIG. 3B) are changed to form an image on the label side of the optical disc.

One of methods for changing the color of a recording unit 24 is to heat the recording unit 24 which has a dye layer on it. When a laser spot emitted from a writing laser heats the recording unit, the dye layer of the recording unit yields a chemically transformation, and thereby the original color of the dye layer is changed.

Figure 4A:
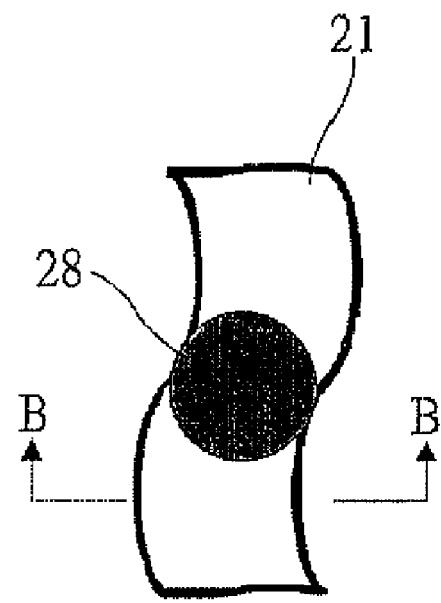
FIG. 4A is a schematic diagram illustrating an enlarged area A shown in FIG. 2B.
Figure 4B:
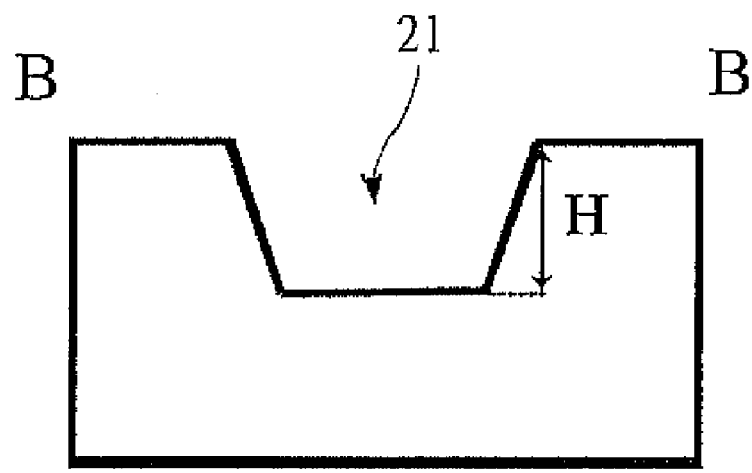
FIG. 4B is a cross section along B-B line shown in FIG. 4A.

Referring to FIG. 2B, an optical pick-up unit (not shown in the figure) moves along the N turns of wobbled grooves 21, according to a laser spot 28 generated by itself, from inner turns to outer turns of the label side 20 or from the outer turns to the inner turns. Thereby, images on the label side 20 can be formed. FIG. 4A is a schematic diagram illustrating an enlarged area A shown in FIG. 2B. FIG. 4B is a cross section along B-B line shown in FIG. 4A. As shown in FIG. 4A, a laser spot 28 moves along a turn of the wobbled groove 21. As shown in FIG. 4B, the wobbled groove 21 is a groove with a depth H formed on the label side 20. In an embodiment, the depth H is preferred in a range from micrometers to tens of micrometers. Additionally, when the laser spot 28 moves along the N turns of wobbled grooves 21, the optical pick-up unit can receive a reflected light of the laser spot 28 and convert the reflected light to a wobble signal. The amount of the recording units 24 went through by the laser spot 28 can be counted by reading the wobble signal.

Registering the laser spot 28 on a correct radial (r) position (i.e. an assigned turn of the wobbled grooves 21) and a correct circumferential (θ) position can make the label image be correctly written. Therefore, according to the invention, wobbles at the connection portion of two adjacent turns of wobbled grooves 21 exist at least one first phase-reversal. A plurality of first phase-reversal pulses will be detected in the wobble signal, wherein each of the first phase-reversal pulses corresponds to one of the phase-reversals. Accordingly, the laser spot 28 can be correctly registered on one assigned turn of the wobbled grooves 21.

Figure 5A:
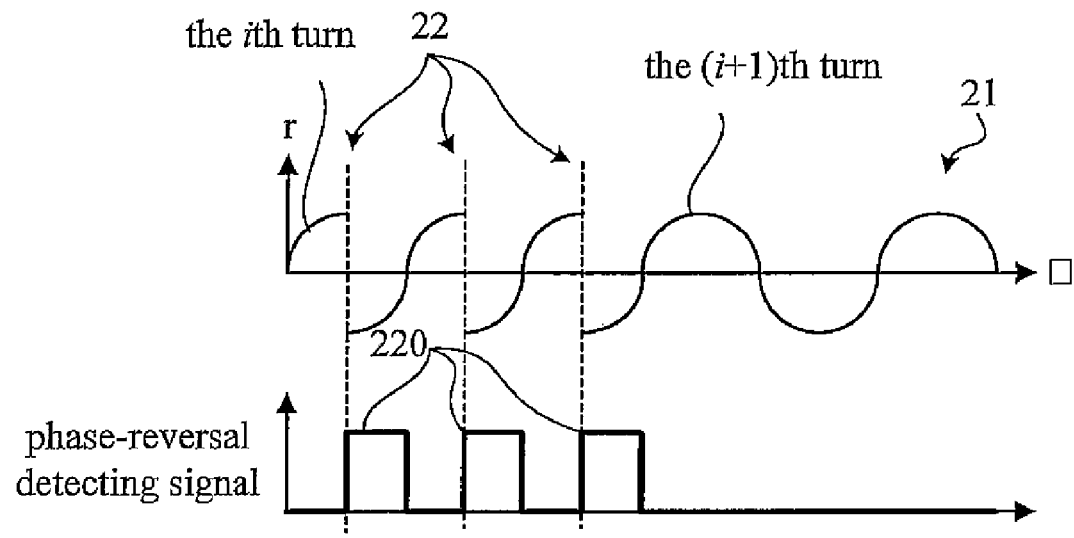
FIG. 5A is a schematic diagram illustrating radial position curves of the ith and the (i+1)th turns of wobbled groove.

Please refer to FIG. 5A. FIG. 5A is a schematic diagram illustrating radial position curves of the ith and the (i+1)th turns of wobbled groove 21. In this embodiment, there are three first phase-reversals 22 at the point where the ith turn of wobbled groove 21 adjoins the (i+1)th turn of wobbled groove 21. When a phase-detecting device monitors a wobble signal, a phase-reversal detecting signal of the wobble signal can be simultaneously generated by the phase-detecting device. When the laser spot 28 moves to the adjoining portion, three first phase-reversal pulses 220 corresponding to the three first phase-reversals 22 are simultaneously detected in the wobbled signal as shown in FIG. 5A.

Figure 5B:
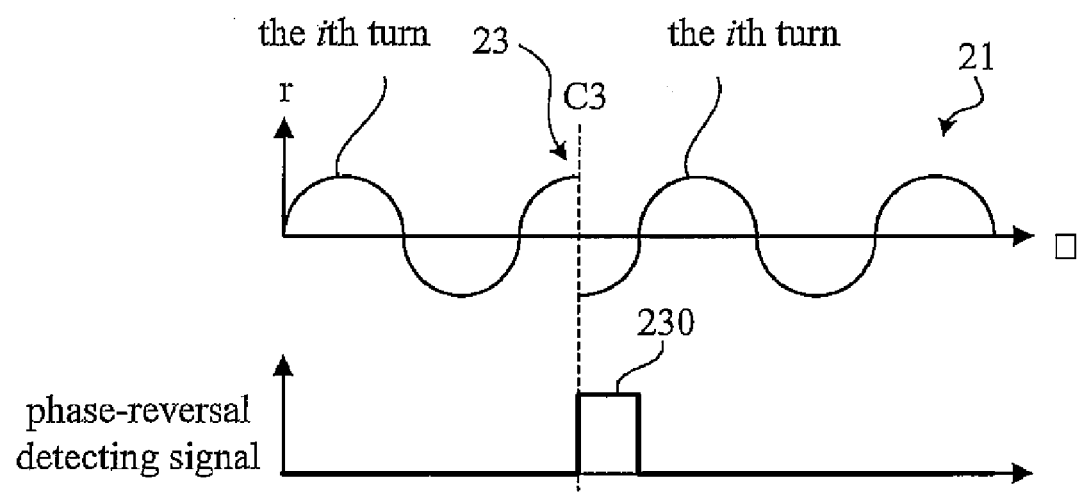
FIG. 5B is a schematic diagram illustrating another radial position curve of the ith turn of wobbled groove.

Referring to FIG. 2B, the label side 20 defines a plurality of specific angles (C1, C2, C3, C4, C5, C6, C7, and C8) with respect to a center of the label side 20. As described above, the laser spot 28 can be registered on the specific angle of the label side 20 according to the invention. Please refer to FIG. 5B. FIG. 5B is a schematic diagram illustrating another radial position curve of the ith turn of wobbled groove 21. As shown in FIG. 5B, the wobble at the specific angle, C3, has one second phase-reversal 23. When the laser spot 28 moves to the phase-reversal 23, a second phase-reversal pulse 230 corresponding to the second phase-reversal 23 is simultaneously detected in the wobble signal. In practical applications, in order to register the laser spot more accurately, outward turns of the wobbled grooves 21 can define more specific angles than inward turns of the wobbled grooves 21.

By utilizing the first phase-reversals 22 and the second phase-reversals 23 in the N turns of wobbled grooves 21, an optical pick-up unit can be registered at a specific radial position and a specific circumferential position on a label side. Further, with counting the wobble cycles of the wobbled grooves 21, the optical pick-up unit can be registered at one of the recording units 24 on the label side, and thereby a label image can be accurately formed.

Referring to FIG. 3B again, it is noted that the distance between two of the wobbled grooves 21 is □r and the length difference between the ith and the (i+1)th turns of wobbled groove 21 is 2·π·□r. With the distance (□r) between the wobbled grooves 21, the (i+1)th turn of wobbled groove 21 has more M wobble cycles than the ith turn of wobbled groove 21. In other words, if there are L recording units in the ith turn of wobbled groove 21, there will be (L+M) recording units in the (i+1)th turn of wobbled groove 21.

Figure 6:
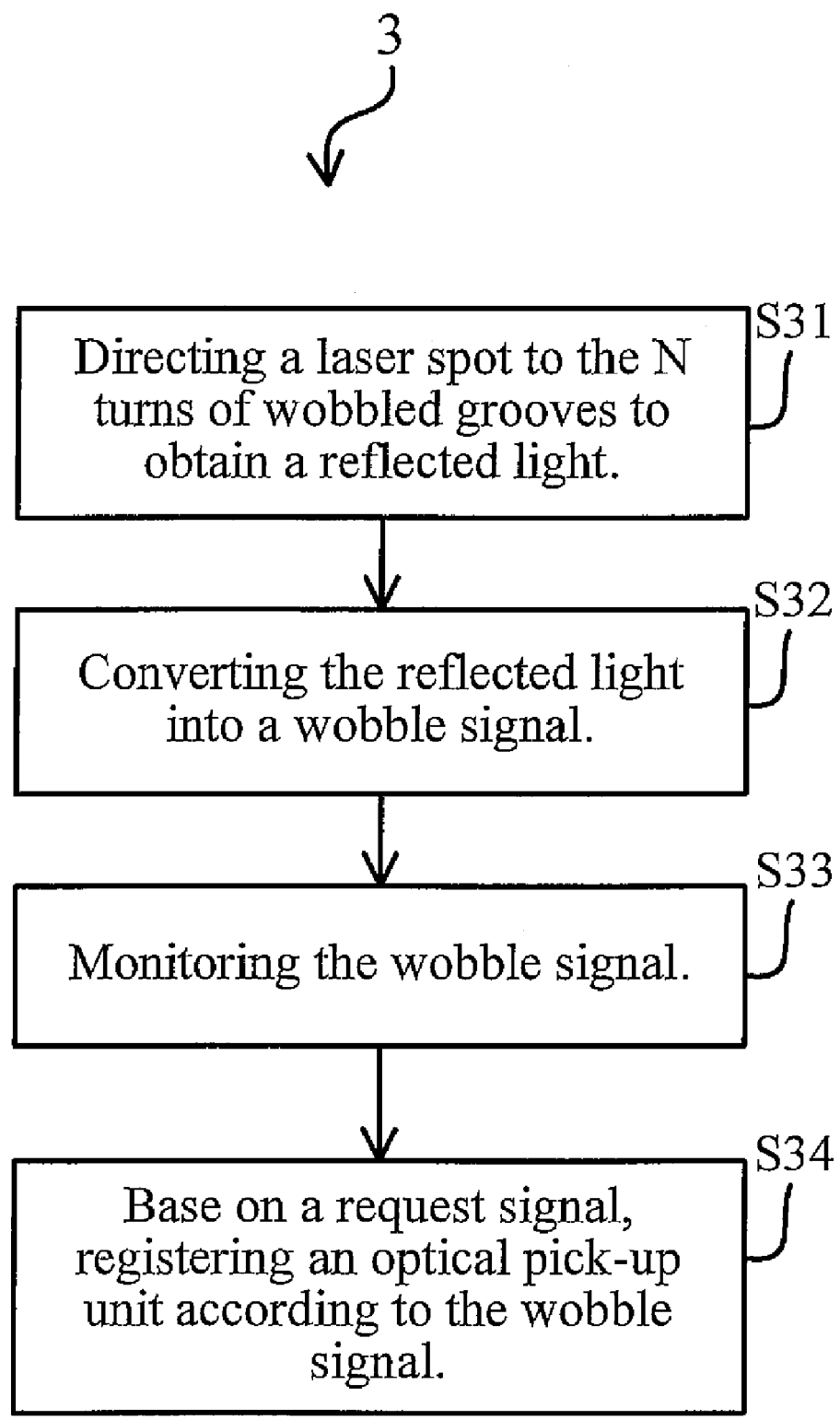
FIG. 6 is a flow chart of a registering method according to a preferred embodiment of the invention.

Please refer to FIG. 6. FIG. 6 is a flow chart of a registering method 3 according to a preferred embodiment of the invention. The register method 3 comprises the following steps.

At first, when an optical disc 2 rotates, step S31 is performed to direct a laser spot 28 emitted from an optical pick-unit to the N turns of wobbled grooves 21 to obtain a reflected light.

Afterward, step S32 is performed to convert the reflected light to a wobble signal.

Step S33 is then performed to monitor the wobble signal. The wobble signal comprises a plurality of first phase-reversal pulses 220, a plurality of second phase-reversal pulses 230, and a plurality of wobble cycles. Each of the first phase-reversal pulses 220 corresponds to one of the first phase-reversals 22, each of the second phase-reversal pulses 230 corresponds to one of the second phase-reversals 23, and each of the wobble cycles corresponds to one of the recording units 24.

At last, base on a request signal, step S34 is performed to register the optical pick-up unit on one of the recording units 24 according to the monitored first phase-reversal pulses 220, the second phase-reversal pulses 230, and the wobble cycles of the wobble signal. The request signal is then generated according to a label image assigned by a user and is used for driving the optical pick-up unit to the assigned recording unit.

In the prior art, the optical pick-up unit was moved toward concentric circle paths to form a label image, and accordingly it took much more time in radial registering. According to the invention, the optical pick-up unit is moved in a spiral track to form a label image. Compared with prior art, the efficiency of forming a label image on an optical disc can be raised.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An optical disc, comprising:
   a data side configured to store data; and
   a label side configured to receive an image, the label side having a plurality of turns of wobbled grooves, the turns of wobbled grooves being connected in series and forming a spiral track;
   wherein the label side defines a radial direction, and the turns of wobbled grooves are formed of wobbles with a fixed cycle in the radial direction, the label side further defines a circumferential direction and the wobbles substantially are extended in the circumferential direction, the wobbles at the connection portion of two adjacent turns of wobbled grooves exhibit at least one first phase-reversal.

2. The optical disc of claim 1, wherein the label side further defines a plurality of specific angles with respect to a center of the label side, and the wobbles at the specific angles exhibit at least one second phase-reversal.

3. The optical disc of claim 2, wherein the label side comprises a plurality of recording units formed along the turns of wobbled grooves, a length of each of the recording units is corresponding to the fixed cycle.

4. A method for registering an optical pick-up unit on a label side of an optical disc, the label side having a plurality of turns of wobbled grooves, the turns of wobbles grooves being connected in series to form a spiral track, the method comprising the steps of:
   (a) while the optical disc is rotated, directing a laser spot emitted from the optical pick-up unit to the turns of wobbled grooves to obtain a reflected light;
   (b) converting the reflected light into a wobble signal;
   (c) monitoring the wobble signal; and
   (d) based on a request signal, registering the optical pick-up unit on one of the turns of wobbled grooves according to the wobble signal;
   wherein the label side defines a radial direction, and the turns of wobbled grooves are formed of wobbles with a fixed cycle in the radial direction, the label side further defines a circumferential direction and the wobbles substantially are extended in the circumferential direction, the wobbles at the connection portion of two adjacent turns of wobbled grooves exhibit at least one first phase-reversal; in step (b), a plurality of first phase-reversal pulses are detected in the wobble signal, and each of first phase-reversal pulses corresponds to one of first phase-reversals.

5. The method of claim 4, wherein in step (d), the optical pick-up unit is further registered, based on the request signal, on one turn of wobbled grooves according to the first phase-reversal pulses of the wobble signal.

6. The method of claim 5, wherein the label side further defines a plurality of specific angles with respect to a center of the label side, the wobbles at the specific angles exhibit at least one second phase-reversal, in step (b), a plurality of second phase-reversal pulses are detected in the wobble signal, and each of second phase-reversal pulses corresponds to one of the second phase-reversals.

7. The method of claim 6, wherein in step (d), the optical pick-up unit is further registered, based on the request signal, on one of the specific angles according to the first and second phase-reversal pulses of the wobble signal.

8. The method of claim 7, wherein the label side comprises a plurality of recording units formed along wobbled grooves, and a length of each of the recording units is corresponding to the fixed cycle.

9. The method of claim 8, wherein in step (d), the optical pick-up unit is further registered, based on the request signal, on one of the recording units according to the first phase-reversal pulses, the second phase-reversal pulses and plural cycles of the wobble signal.

* * * * *